United States Patent [19]

Prior et al.

[11] 4,298,025
[45] Nov. 3, 1981

[54] CONTROL VALVE FOR WATER SOFTENERS

[75] Inventors: William C. Prior, Newbury; Keith E. Brown, Solon, both of Ohio

[73] Assignee: Kinetico, Inc., Newbury, Ohio

[21] Appl. No.: 146,218

[22] Filed: May 5, 1980

[51] Int. Cl.³ .............................................. B01J 47/14
[52] U.S. Cl. ......................... 137/624.14; 137/624.18; 210/88; 210/98; 210/190
[58] Field of Search ...................... 137/624.14, 624.18; 210/87, 88, 98, 141–143, 190, 191

[56] References Cited

U.S. PATENT DOCUMENTS 3,509,998  5/1970  Pellett et al. .................. 137/624.14
3,891,552  6/1975  Prior et al. .......................... 210/190

Primary Examiner—Ivars C. Cintins
Attorney, Agent, or Firm—Watts, Hoffmann, Fisher & Heinke Co.

[57] ABSTRACT

An improved water softener control valve having a housing defining a servo-control chamber that encloses concentrically mounted water usage and regeneration control discs. Each disc is incrementally rotatable by ratchet drives that are driven by water usage and regeneration control turbines, respectively, through associated reduction gear trains. The ratchet drive for the water usage disc includes a pawl that is engageable with the regeneration control disc, which upon predetermined movement in the water usage disc effects movement in the regeneration control disc to initiate a regeneration cycle. A rotatable insert is provided in the housing for manually rotating the regeneration control disc.

10 Claims, 5 Drawing Figures

CONTROL VALVE FOR WATER SOFTENERS

BACKGROUND OF THE INVENTION

The present invention relates generally to water softeners and more specifically, to improvements in the water softener control device described in U.S. Pat. No. 3,891,552, the disclosure of which is incorporated herein by reference.

Water softeners of the "ion exchange" type typically include a resin tank through which hard water passes to exchange its "hard" ions of calcium and magnesium for "soft" sodium ions from the resin bed. Regeneration of the resin bed is required periodically to remove the accumulation of hard ions and replenish the supply of soft ions. Regeneration is effected by flushing a solution of salt through the resin bed.

U.S. Pat. No. 3,819,552 discloses a control valve for controlling a water softener having two ion exchange tanks. With this type of water softener/system, the soft water supply is not interrupted during regeneration because the exhausted tank is regenerated while the other tank is put "on-line". The newly regenerated tank is then left off-line until the on-line tank is exhausted.

The control valve of the prior patent included a valve-operating servo-system that was responsive to soft water usage. The servo-system controlled which of the ion exchange tanks was on-line and also controlled the regeneration sequence of the exhausted tank.

The principal components of the servo-system included a water usage indicator disc and a regeneration control disc mounted in the top of the control valve housing. Rotation of the indicator and control discs was effected through water driven turbines disposed in appropriate water flow paths. The turbines were directly coupled or geared to their respective discs through a reduction gear train. The water usage turbine was disposed in the path of soft water discharge so that turbine revolutions were directly proportional to the amount of water used. The regeneration control turbine was disposed in the path of a controlled or metered flow of water which impinged on the turbine only during a regeneration cycle.

Because the flow of large volumes of water must be translated to small movements in the water usage and regeneration control discs, relatively high reduction gear trains were employed between the turbines and the respective discs. Specifically, the final drive gear which engaged and rotated the regeneration control disc was driven at about one thirteen-thousandth the speed of the regeneration turbine, while the final drive gear that drove the water usage disc rotated about one forty-thousandth the speed of the water usage turbine. The large gear reductions necessary between the turbines and the discs required the use of rather complex gear trains having a large number of interconnecting gear wheels and minute gear teeth. If deposits or impurities carried by the water interfered with the gear trains driven by the water usage and regeneration turbines, the minute gear teeth employed in the gear trains could jam, thereby resulting in improperly softened water and requiring repair of the valve.

In the prior valve, the regeneration cycle was initiated by the concurrent rotation of both the water usage and regeneration control discs after the water usage disc had moved a predetermined distance. This concurrent movement was accomplished by using spaced gear segments on both the control and water usage discs which when aligned were concurrently driven by an idler pinion while the water usage disc was rotated by its drive pinion. This arrangement required a lost motion connection between the regeneration control disc and its associated drive pinion so that initial movement of the regeneration control disc would occur. Without this lost motion connection, movement of the regeneration control disc would be inhibited by the regeneration gear train and it could not be rotated by the water usage disc.

The foregoing construction of the prior valve prevented manual rotation of either the water usage or regeneration control discs. The substantial gear reductions between the turbines and the respective discs prevented rotation and made it impossible to manually sequence the control valve or initiate regeneration.

SUMMARY OF THE INVENTION

The present invention provides a new valve-operating servo-system which can be incorporated into the soft water control valve of U.S. Pat. No. 3,891,552 so that the valve operates in an improved manner. The new servo-control system reduces manufacturing costs and assembly time, and provides enhanced reliability in use. An important feature of the new system is a provision for manually initiating the regeneration cycle without requiring valve disassembly.

The preferred embodiment of the invention retains the water usage and regeneration control turbines of the prior valve. In the present invention, the water usage turbine drives an indexing arrangement that is engageable with the water usage indicating disc. The indexing components are not directly coupled or geared to the disc so that it can be rotated independently of the water usage turbine. A similar indexing arrangement is preferably employed to actuate the regeneration control disc. Like the water usage disc, it can also be rotated independently of the regeneration control turbine and associated gear train.

In addition to permitting the water usage and regeneration control discs to be rotated independently of the respective gear trains and turbines, the new indexing arrangement of the invention eliminates the complex gear trains employed in the prior valve. Although some gear reduction is necessary between the turbines and associated discs, the present invention obviates the need for the numerically high gear reductions of the prior control valve. The gear trains of the present invention require less gear wheels and allow the use of larger mating gear teeth between the gear wheels. The reduction in the number of gear train parts coupled with the enlargement of the gear teeth reduces material costs and assembly time, while enhancing the reliable operation of the valve.

The preferred indexing structure that effects incremental rotation of the water usage disc comprises a ratchet drive in the form of a pawl journalled on an eccentric shaft which is directly driven and coupled to the water usage turbine by a reduction gear train. A similar ratchet drive having a pawl and eccentric shaft translates revolutions of the regeneration control turbine to incremental movements in the regeneration control disc. The water usage and regeneration control discs each include perimetrically disposed ratchet teeth engageable by the respective pawls. Each pawl is biased toward engagement with the periphery of its respective disc so that a revolution of the eccentric shaft imparts a reciprocating motion to the pawl and effects movement of the disc.

This preferred construction provides a simple but reliable method for effecting movement of the water usage and regeneration control discs. Because the rotary motion of the turbines is transformed into small linear motions of the pawls, numerically lower gear reductions can be employed as compared to those in the prior valve. Additionally, the ratchet drives increase the effective gear ratio between the eccentric drive shafts and the discs thereby increasing the operational torque available for incrementally rotating the discs.

According to a feature of the invention, the initial movement the regeneration control disc necessary to initiate the regeneration cycle is accomplished by the indexing apparatus. In its preferred form, the indexing components include a third pawl that is journalled on the same drive shaft as the water usage drive pawl and biased toward engagement with the ratchet teeth of the regeneration control disc. The water usage disc includes an axially depending flange having spaced peripherally disposed slots. The third drive pawl includes a prong that extends beyond the pawl engagement surface and is located so that it contacts the outer surface of the flange of the water usage disc. When in contact with the flange, the prong prevents engagement between the regeneration control disc and the third pawl. However, when a slot becomes aligned with the prong, the prong enters the slot and allows the third pawl to engage the ratchet teeth of the regeneration control disc effecting movement of this disc upon rotation of the eccentric shaft. Thus, concurrent movement of the water usage and regeneration control discs is effected whenever the slot is aligned with the prong.

Once regeneration has been initiated, a metered flow of softened water is directed against the regeneration control turbine and further movement of the regeneration control disc is effected through its associated indexing mechanism driven by the regeneration control turbine and associated gear train. The third pawl and driving arrangement, provides a very efficient way for initiating the regeneration cycle while, at the same time, eliminating the need for the spaced gear segments and idler pinion of the prior valve.

According to another feature of the invention, provision is made for manually rotating the regeneration control disc from outside the control valve. The pawl/ratcheting engagement between the gear trains and the discs allows the discs to be rotated independent of the gear trains. A rotatable insert extends through a top cover in the valve housing and is engageable with a projection or dog that extends upwardly from the regeneration control disc. In normal operation, the insert is biased out of engagement with the control disc by water pressure within the control valve. If manual regeneration is desired, the insert is depressed and rotated so that it engages and concurrently rotates the control disc below it. This feature allows a regeneration cycle to be initiated at any time and also allows one to quickly perform a functional test of the valve.

A fuller understanding and additional features of the invention will become apparent in reading the following detailed description made in connection with the accompanying drawings.

DESCRIPTION OF THE PREFERRED EMBODIMENT

Figure 1:
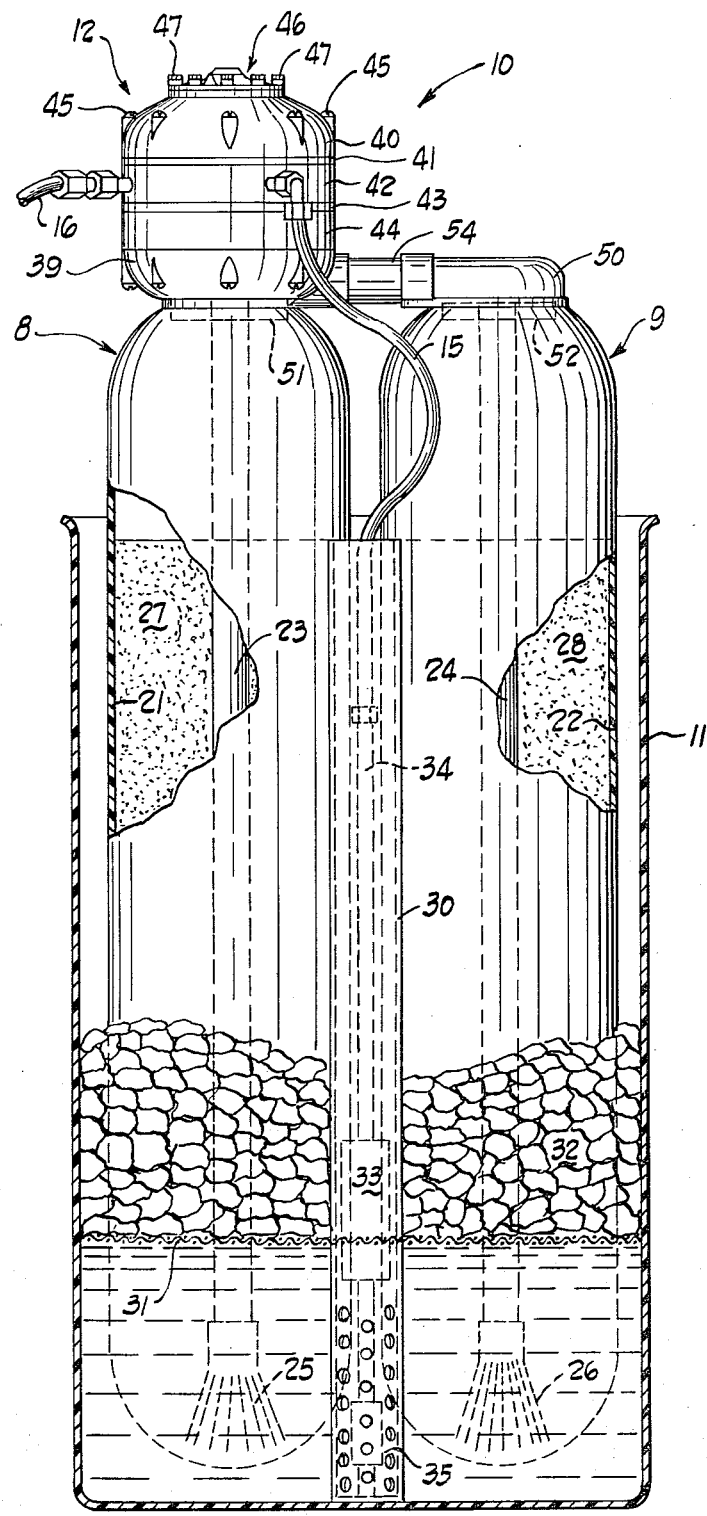
FIG. 1 is a cross-sectional view of a water softener employing the control valve of the present invention, with portions of the softener tanks being broken away.

Referring to FIG. 1, a water softener 10 includes a pair of softener tanks 8, 9 positioned upright in an open-top brine tank 11. A valve assembly 12 is supported atop the tanks, 1, 2. The valve assembly 12 is programmed, as will be explained, to selectively maintain one of the tanks 8, 9 on-line with a household water supply system. The off-line tank is subjected to a regeneration cycle and then held off-line until the on-line tank is exhausted. The frequency with which the valve assembly 12 switches the tanks 8, 9 from on-line operation to regeneration is controlled by monitoring the usage of softened water.

Figure 2:
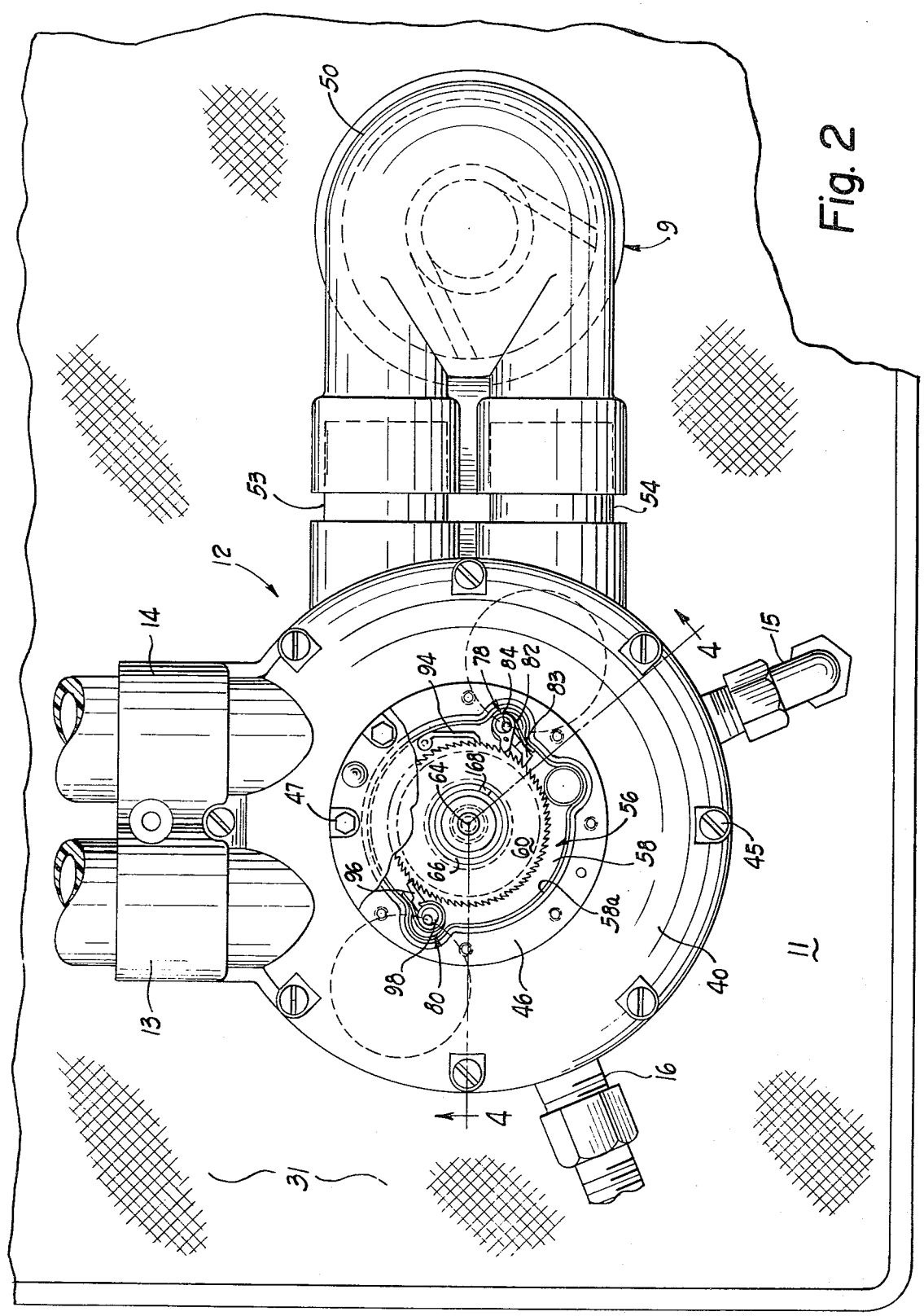
FIG. 2 is an enlarged top plan view of the water softener shown in FIG. 1, with portions of the control valve being broken away.

Referring also to FIG. 2, four conduits communicate with the valve assembly 12. Hard water is delivered to the valve assembly 12 through an inlet conduit 13. Softened water is discharged from the valve assembly 12 through an outlet conduit 14. Brine from the brine tank 11 is admitted to the valve assembly 12 through a brine conduit 15. Waste water from the regeneration cycle is discharged from the valve assembly through a drain conduit 16.

The softener tanks 8, 9 are of known configuration and utilize common water softening chemicals. The tanks 8, 9 typically include cylinders 21, 22 of glass fiber construction which are about 7 inches in diameter and 35 inches in length. The upper ends of the cylinders 21, 22 are threaded with female 2½ inch NPT threads for connection to the valve assembly 12. Riser pipes 23, 24 depend centrally through the cylinders 21, 22. A pair of screens 25, 26 communicate with the lower ends of the riser pipes, 23, 24. Suitable ion-exchange softening chemicals, indicated by the numerals 27, 28, are positioned in the cylinders 21, 22 surrounding the riser pipes 23, 24 and the screens 25, 26.

The water softening process takes place as water passes through the tanks 8, 9. Hard water is channeled into the cylinders 21, 22 and is softened during its passage downwardly through the chemicals 27, 28. Softened water enters the riser pipes 23, 24 through the screens 25, 26 and is directed back out of the cylinders 21, 22.

The brine supply system is of known configuration and utilizes common ion replacement salts to regenerate the softening chemicals 27, 28. The brine tank 11 is a round, upstanding, open-top container formed from suitable metal or plastic. An upstanding brine well 30 is positioned centrally in the brine tank 11. The brine well is an open-top tubular member formed from suitable metal or plastic. The lower region of the brine well 30 is apertured to admit brine.

A screen 31 extends horizontally in the brine tank 11 in regions around the softener tanks 1, 2 and around the brine well 30. The screen 31 is positioned about six inches up the wall of the brine tank 11. Granular salt material 32 is deposited in the brine tank 11 and rests atop the screen 31.

A brine control valve 33 of known configuration is positioned in the brine well 30. The valve 33 includes a pipe 34 which is connected at its upper end to the brine conduit 15. The lower end of the pipe 34 communicates with a valve assembly 35 which serves the dual functions of admitting a regulated amount of brine solution from the brine well 30 to the pipe 34 when the water softener establishes a suction in the brine conduit 15, and of admitting a regulated amount of softened water to the brine well 30 from the pipe 34 when the brine conduit 15 is connected to a source of pressurized softened water.

The valve assembly 12 includes a stacked array of four disc-like members 41, 42, 43, 44 interposed between a base member 39 and a top member 40. Threaded fasteners 45 extend through aligned holes in the top and disc members 40–44 and are received in threaded holes formed in the base member 39 to clamp the members 39–44 together. A cover assembly 46 overlies portions of the top member 40 and is held in place by threaded fasteners 47.

A tank connector 50 is provided to the right of the base member 39 as viewed in FIGS. 1 and 2. Threaded depending necks 51, 52 are formed on the base member 39 and on the tank connector 50 for connection with the softener tanks 8, 9. A pair of conduits 53, 54 establish communication between the base member 39 and the tank connector 50. Hard water is delivered from the base member 39 through the conduit 53 and through the tank connector 50 to the softener tank 9. Softened water from tank 9 is returned through the tank connector 50 and through the conduit 54 to the base member 39.

Except for the disc member 40 and its associated components, the construction and operation of the remaining portions of the valve assembly 12 are substantially identical to that disclosed in U.S. Pat. No. 3,891,552, which is hereby incorporated by reference. By way of summary, the stacked members 41, 42, 43, 44 and base member 39, together house a plurality of servo valves which control the communication of the tanks 8, 9 with the brine solution in the tank 11 and with the inlet and outlet conduits 13, 14. Movement in the servo valves is achieved by the selective application of pilot pressures to piston chambers associated with each servo valve. The communication of these pilot pressures to the piston chambers is determined by a servo control mechanism housed in the member 40 that is constructed in accordance with the present invention.

Figure 3:
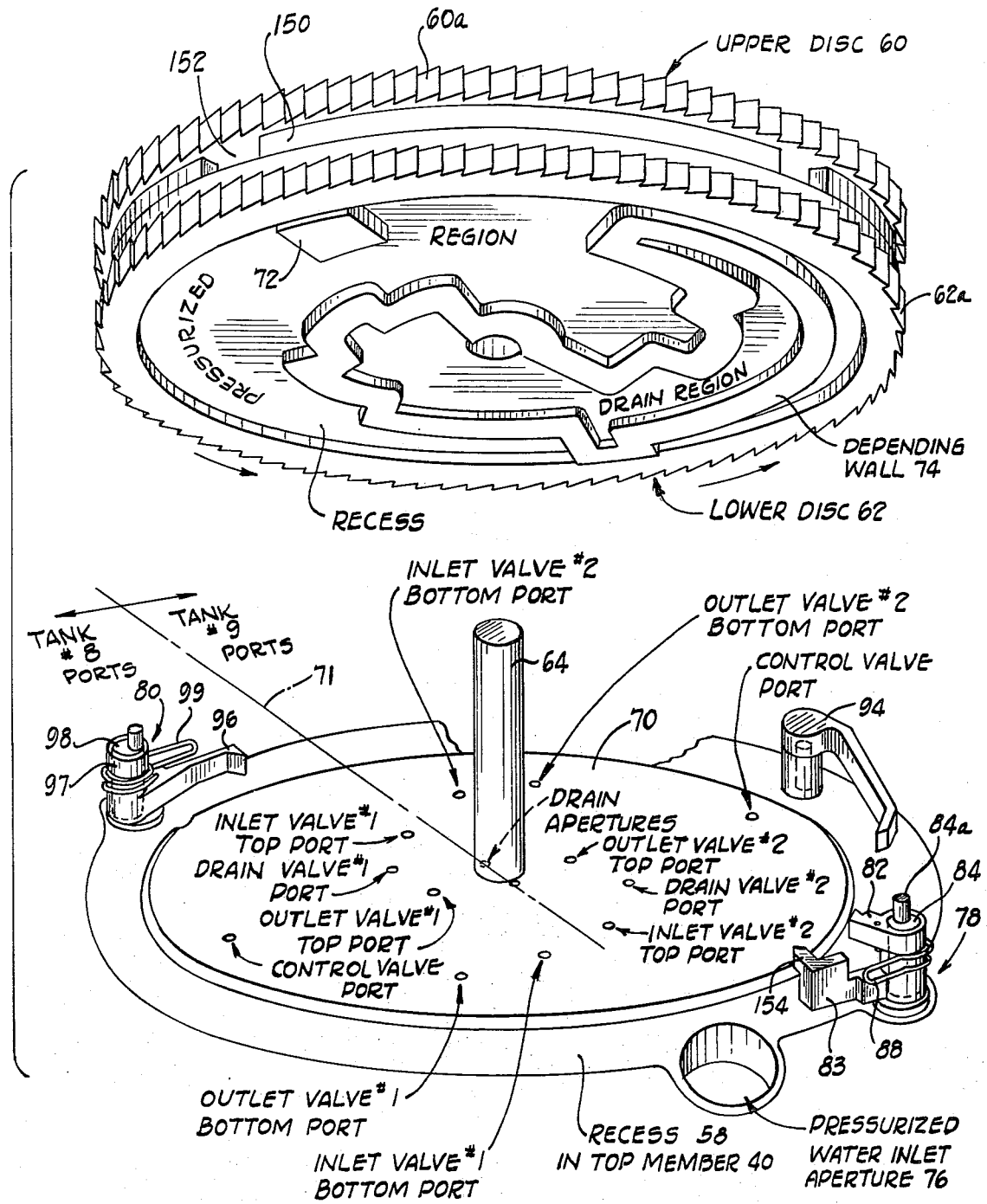
FIG. 3 is a schematic view depicting selected parts of the valve of FIG. 1 which form the servo control system; and, FIG. 4 is an enlarged cross-sectional view as seen from the plane indicated by the line 4—4 in FIG. 2.
Figure 4:
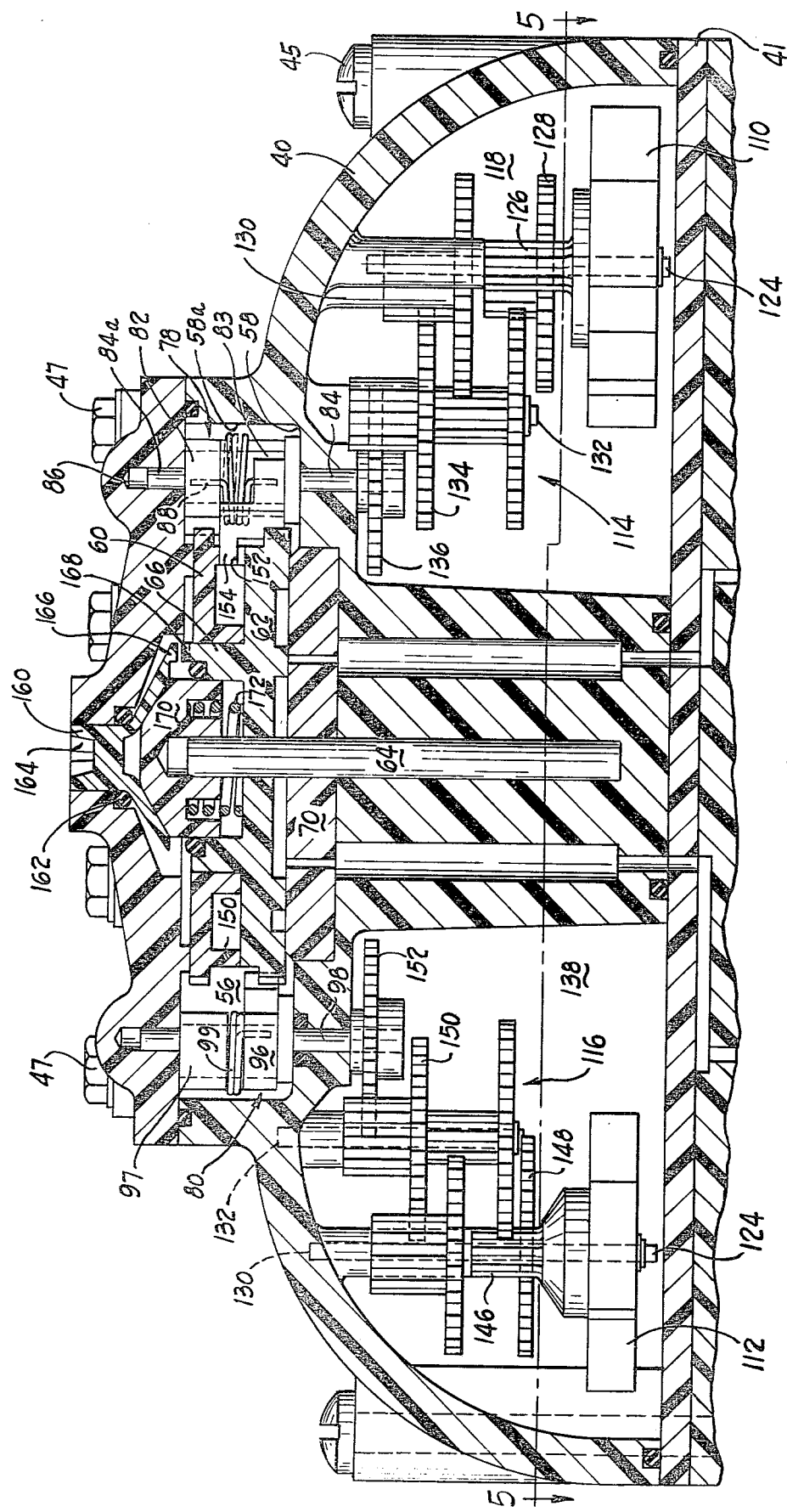

Referring to FIGS. 2, 3 and 4, the servo control mechanism is located in an enclosed chamber 56 defined by a recess 58 in the top member 40 and the cover assembly 46 which overlies the recess. The servo control mechanism includes a pair of concentrically positioned discs 60, 62, each disc having perimetrically disposed ratchet teeth 60a, 62a, respectively. An upwardly extending stub shaft 64 defines an axis of rotation for the discs. The lower disc 62 is journaled on the shaft 64 and includes a hub 66 (shown in FIGS. 2 and 4) which rotatably supports the upper disc 60.

The upper disc 60 is designated as a water usage monitor disc and its movement is a function of the amount of softened water discharged by the water control valve assembly 12 through the outlet 14. The lower disc 62 is a regeneration control disc and its movement controls the regeneration sequence for an exhausted softener tank.

As explained in greater detail in U.S. Pat. No. 3,891,552, the regeneration control disc 62 rotates in confronting contact with a disc-like, non-rotatable insert 70, positioned in the bottom of the recess 58. The insert includes a plurality of ports which communicate with piston chambers that operate the servo valves through pilot pressure passages integrally formed in the various members of the control valve assembly 12. As seen in FIG. 3, two sets of ports are provided and are located symmetrically about an imaginary diametral line 71. The ports to the left of the line 71 control the regeneration of the tank 8, whereas the ports to the right of the line 71 control the regeneration sequence for the tank 9. It should be apparent, that during a regeneration cycle, the lower disc 62 rotates 180° to effect a complete regeneration cycle of one of the tanks. It should be noted, that the location of the ports and their function, as shown in FIG. 3 correspond to the ports shown and described in U.S. Pat. No. 3,891,552.

Referring to FIG. 3, the regeneration control disc 62 includes a depending projection 72, and a depending wall 74 that divides the undersurface of the disc into a pressurized region and a drain region. Softened water at supply pressure is admitted into the chamber 56 through a water inlet aperture 76. Because the lower surfaces of the projection 72 and the depending wall 74 are slightly lower than the undersurface of the rim of the lower wheel, water can flow into and pressurize the pressurized region. The wall 74 sealingly engages the insert 70 and isolates the drain region from the pressurized region. The drain region is maintained at an ambient drain pressure by drain ports located near the stub shaft 64 which communicate with a drain conduit 16 through integrally formed flow passages in the control valve assembly 12.

In the preferred embodiment, the water usage and regeneration control discs 60, 62 are incrementally rotated by an indexing arrangement in the form of ratchet drives 78, 80. The ratchet drive 78 comprises a pair of pawls 82, 83 journaled and co-driven by an excentric shaft 84. The upper end 84a of the shaft 84 is located by a bore 86 in the top cover assembly 46 (see FIG. 4). A spring 88 acting between a side wall 58a of the recess 58 urges the pawls 82, 83 towards the peripheral ratchet teeth 60a, 62a of the water usage and regeneration control discs 60, 62, respectively. A fixed, resiliently biased pawl 94 also engages the ratchet teeth of the upper disc 60 and prevents reverse rotation.

The ratchet drive 80 comprises a pawl 96 journaled and driven by an excentric shaft 98 and urged toward engagement with the regeneration control disc 62 by a spring 99 acting between the side wall 58a and the pawl 96. A spacer bushing 97 maintains the pawl 96 in the lower most position on the shaft 98 as shown.

Figure 5:
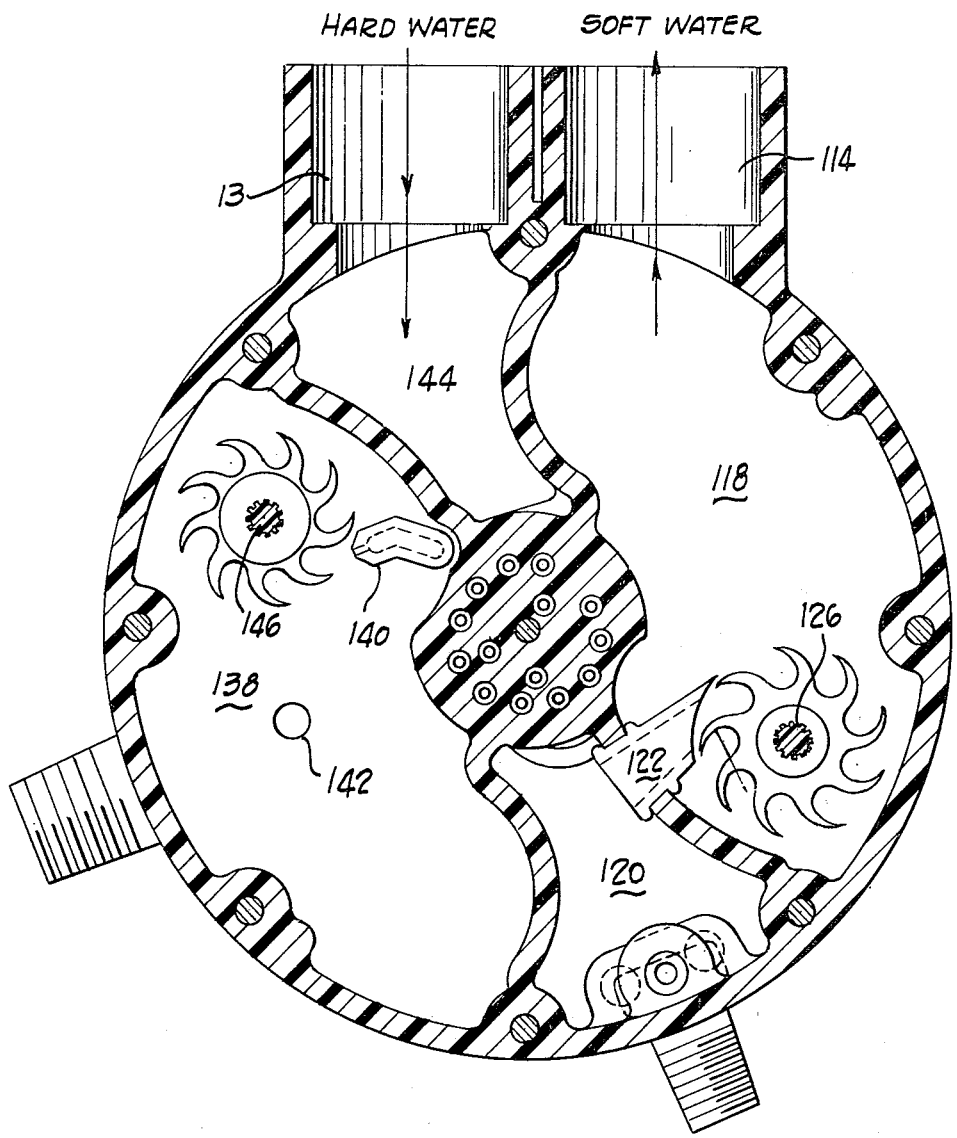
FIG. 5 is a cross-sectional view as seen from the plane indicated by the line 5—5 in FIG. 4.

Referring to FIGS. 4 and 5, the eccentric shafts 84, 98 which upon rotation produce the necessary reciprocating motion in the ratchet drives 78, 80 are coupled to water usage and regeneration control turbines 110, 112 by reduction gear trains, indicated generally by the reference characters 114, 116, respectively. The water usage turbine 110 and associated gear train are located in an outlet chamber 118 defined by the top member 40 and the upper disc member 41 that communicates with the outlet conduit 14. Softened water is delivered to the outlet chamber 118 from a softened water collection chamber 120 by way of a channel 122. The flow of softened water to the collection chamber 120 from the softener tanks 8, 9 is controlled by servo valves housed in the lower portions of the control valve assembly 12 and described fully in the above referenced patent. The channel 122 directs softened water from the collection chamber 120 to the turbine blades 110 and thus any softened water discharged through the control valve causes attendant rotation in the water usage turbine.

The water usage turbine 110 is rotatably supported by a downwardly extending shaft 124 and includes an integrally formed pinion gear 126 that drives a first reduction gear 128. A plurality of cascading reduction gears are journaled on spaced shafts 130, 132. A final reduction gear 134 mates with an input gear 136 fixed to the end of the eccentric shaft 84.

The regeneration control turbine 112 and associated gear train is located in an overflow chamber 138 defined by the top member 40 and the upper disc member 41. During a regeneration cycle, a controlled flow of softened water is discharged through a nozzle 140 located in close proximity to the regeneration turbine 112 so that the discharged fluid impinges on the turbine blades to cause rotation in the turbine 112. The fluid leaving the turbine blades leaves the overflow chamber through a port 142 that communicates with the drain conduit 16.

The incoming hard water is delivered to an inlet chamber 144 through the inlet conduit 13. The inlet chamber 144 is defined in part by the top member 40. The communication of the incoming hard water to one or both of the tanks 8, 9 is controlled by inlet valves described and discussed in the above referenced patent.

The regeneration control turbine 112 includes an integrally formed pinion gear 146 that drives a first reduction gear 148. A similar cascading gear train is in turn driven by the first reduction gear 148. A final reduction gear 150 mates with an input gear 152 fixed to the end of the excentric shaft 98 that journals the pawl 96. Thus, rotation of the regeneration turbine during a regeneration cycle is translated to reciprocating motion in the pawl 96 which in turn causes incremental movement in the regeneration control disc 62.

A regeneration cycle is initiated whenever one of the control valve ports (shown in FIG. 3), located in the inserts 70 is uncovered by the projection 72 and thus exposed to softened water in the pressurized region. The communication of pressurized softened water to the control valve ports opens a control valve which in turn connects a source of softened water to the nozzle 140. A regeneration cycle continues until the control valve port is again covered and isolated from the soft water pressure in the servo chamber 56, thus closing the control valve and terminating the flow from the nozzle 140.

Because the ratchet drive 96 is operative only when the nozzle 140 is discharging fluid, the regeneration control disc 62 must be moved initially by the ratchet drive 78 to begin the regeneration cycle. This initial movement is achieved by the lower pawl 83 in conjunction with the water usage disc 60. As seen in FIG. 3, the water usage disc 60 includes a discontinuous axially depending flange 150 located near the periphery of the disc, just below the ratchet teeth. The surface of the flange 150 is interrupted periodically by slots 152 which are preferably equally spaced around the circumference of the flange. The lower pawl 83 of the ratchet drive 78 includes a camming prong 154 which extends beyond the tip of the pawl. The prong 154 is located in the same plane as the slotted flange 150 of the water usage disc 60. When riding against the outer surface of the flange, the prong 154 displaces the pawl away from the ratchet teeth of the regeneration control disc 62. When the prong 154 drops into one of the slots 152 in the flange (shown in FIG. 4), it allows the pawl to engage the ratchet teeth of the regeneration control disc and thus rotation of the shaft 84 causes concurrent movement in the water usage and regeneration control discs 60, 62. The initial movement effected in the regeneration control disc by the ratchet drive 82 rotates the disc 62 sufficiently to cause the projection 72 to uncover one of the control ports, thus initiating a regenerating cycle. Once a control port is opened, the fluid discharged by the nozzle 140 will operate the ratchet drive 80 to continue movement in the regeneration control disc. The regeneration cycle is terminated when the control disc 62 rotates to a position where the control valve ports are again closed.

Because a regeneration cycle is initiated whenever the prong 154 becomes aligned with a slot 152 in the water usage disc 60, the frequency of regeneration is determined by the frequency or spacing of the slots in the flange 150. Generally, a water usage disc having an appropriate number of slots is selected at installation in accordance with the hardness of the water at the installation site. It should be apparent that the frequency of regeneration can be modified or changed at any time by the appropriate replacement of the water usage disc 60.

According to a feature of the invention, means is provided for manually cycling the control valve 12 through a regeneration sequence without requiring valve disassembly. Referring to FIG. 4, this is achieved by an insert or stem 160 that is journaled in and extends through the top cover 46. An O-ring seal 162 prevents fluid leakage out of the servo chamber 56. The stem 160 includes an exposed head 164 for receiving a suitable implement such as a phillips screw driver. The lower end of the stem 160 includes a downwardly depending tang 166 which is engageable with an upwardly extending dog or projection integrally formed on the radial end surface of the hub 66 of the regeneration control disc 62. In order to rotate the regeneration control disc, an implement, such as a phillips screw driver, is placed in the stem 160 and pressure is applied to depress the stem downwardly. The stem is rotated until the tang 166 engages the dog 168. Further rotation then causes rotation of the regeneration control disc 62. In the preferred embodiment, one side of the dog 168 is inclined so that only one abutting surface is provided. This feature assures that the stem 160 can be used to rotate the regeneration control disc in one direction only, i.e., its normal operating direction.

It should be noted, that the stem 160 is located immediately above and concentric with a balancing piston 170, the operation of which is disclosed in U.S. Pat. No. 3,891,552. Briefly, in operation the pressurized softened water in the chamber 56 normally urges the balancing piston downwardly against the force of a biasing spring 172. The force exerted by the spring insures that the depending wall 74 and the projection 72 on the undersurface of the control disc 62 is maintained in sealing contact with the insert 70. Thus in normal operation, the balancing piston is spaced from the stem 160 (in FIG. 4, the balancing piston is shown in the position it assumes when the chamber 56 is not pressurized). Moreover, the water pressure in the chamber 56 urges the stem 160 upwardly and maintains the stem in its uppermost position as shown in FIG. 4 and out of engagement with the dog 168.

Although this invention has been described with a certain degree of particularity, various changes can be made to it by those skilled in the art without departing from the spirit or scope of the invention as described and hereinafter claimed.

We claim:

1. In a water softener control device including a housing enclosing a water usage monitoring means and a regeneration control means, the improvement comprising:
   (a) a water usage turbine rotatably mounted within the control device in the path of discharged softened water;
   (b) a water usage disc supported within said housing for rotational movement in proportion to the amount of water discharged from the control device;
   (c) a regeneration control disc for controlling the sequence of water softener regeneration;
   (d) a regeneration control turbine disposed in a path of metered fluid flow; and,
   (e) ratchet drive means interposed between said turbines and said discs for incrementally rotating said discs in response to turbine rotation.

2. The improvement as claimed in claim 1 in which said ratchet drive means comprises a first drive pawl and means eccentrically mounting said first pawl for ratcheting movement in response to rotation of said water usage turbine.

3. The improvement of claim 2 wherein said water usage disc includes perimetrically disposed ratchet teeth engageable by said first pawl.

4. The improvement of claim 1 wherein said ratchet drive means comprises first and second eccentrically driven pawls mounted for reciprocating tangential movement with respect to said water usage and regeneration control discs, respectively and wherein said water usage and regeneration control discs each include perimetrically disposed ratchet teeth engageable by said first and second pawls respectively.

5. In a water softener control device including a housing enclosing a water usage monitoring means and a regeneration control means, the improvement comprising:
   (a) a water turbine rotatably mounted within said control device in a path of discharged softened water;
   (b) a water usage disc including perimetrically disposed ratchet teeth mounted for rotative movement in said housing, movement in said disc being in proportion to the amount of softened water discharge from the control device;
   (c) a regeneration control disc mounted for rotation, coaxial with said water usage disc, said control disc controlling the sequence of water softener regeneration;
   (d) a regeneration control turbine disposed within said housing in a path of metered fluid flow;
   (e) a first indexing means operatively driven by said water usage turbine, said first indexing means being engageable with said ratchet teeth of the water usage disc and operative to incrementally rotate said disc after a predetermined number of turbine revolutions;
   (f) a second indexing means driven by said regeneration control turbine and operative to incrementally rotate said control disc upon a predetermined number of revolutions of said regeneration turbine.

6. The improvement of claim 5 wherein said water usage disc includes an axially depending flange having peripherially disposed slots, and said first indexing means comprises a second eccentrically driven pawl driven coaxially with a first pawl and engageable with the regeneration control disc, when said second pawl is in predetermined alignment with one of the slots in said flange.

7. In a water softener control device including a housing enclosing a water usage monitoring means and a regeneration control means, the improvement comprising:
   (a) a water usage disc supported for rotation in said housing, said disc indicating the amount of softened water discharged from the control device;
   (b) a disc drive means for rotating said disc in proportion to the amount of softened water discharged from said control device;
   (c) a regeneration control disc for controlling the sequence of water softener regeneration;
   (d) drive means for rotating said control disc during a regeneration cycle
   (e) drive release means for disengaging the control disc from the control disc drive to allow independent rotation of said control disc by an external force;
   (f) a rotatable stem extending through a cover portion of said housing engageable with said control disc such that rotation of said stem causes a concurrent rotation in said control disc when said stem and control disc are engaged.

8. The improvement of claim 7 wherein said control disc drive means includes a regeneration control turbine rotatably mounted within said housing in a path of metered fluid flow and said turbine eccentrically drives a pawl engageable with perimetric ratchet teeth on said control disc.

9. The improvement of claim 8 wherein said control disc includes an axially hub coaxial with and rotatably supporting said water usage disc, said hub further including an upwardly extending prong and said stem includes a downwardly extending flange engageable with the prong on said control disc hub.

10. In a water softener control apparatus including a housing enclosing a water usage monitoring means and a regeneration control means, the improvement comprising:
    (a) a water usage turbine rotatably mounted within the housing in a path of fluid flow;
    (b) a usage disc element supported within the housing for rotational movement in proportion to the amount of fluid flow along said fluid path;
    (c) a regeneration control means for controlling a water softener regeneration cycle; and
    (d) ratchet drive means interposed between said water usage turbine and said element for incrementally rotating said element in response to turbine rotation.

* * * * *

UNITED STATES PATENT AND TRADEMARK OFFICE
CERTIFICATE OF CORRECTION

PATENT NO. : 4,298,025

DATED : November 3, 1981

INVENTOR(S) : William C. Prior and Keith E. Brown

It is certified that error appears in the above—identified patent and that said Letters Patent is hereby corrected as shown below:

Column 10, line 45, after "axially" insert --extending--.

Signed and Sealed this

Second Day of February 1982

[SEAL]

Attest:

*Attesting Officer*

GERALD J. MOSSINGHOFF

*Commissioner of Patents and Trademarks*